L. R. SPENCER.
ENGINE PISTON.
APPLICATION FILED DEC. 31, 1921.

1,430,928.

Patented Oct. 3, 1922.

INVENTOR
Louis R. Spencer
Harry P. Williams
ATTORNEY

Patented Oct. 3, 1922.

1,430,928

UNITED STATES PATENT OFFICE.

LOUIS R. SPENCER, OF HARTFORD, CONNECTICUT.

ENGINE PISTON.

Application filed December 31, 1921. Serial No. 526,170.

*To all whom it may concern:*

Be it known that I, LOUIS R. SPENCER, a citizen of the United States, residing at Hartford, in the county of Hartford and State of Connecticut, have invented a new and useful Improvement in Engine Pistons, of which the following is a specification.

This invention relates to the construction of composite pistons for internal combustion motors.

The object of the invention is to provide a piston having a body of hard metal which has little expansion and a head of light metal which radiates heat rapidly, so designed that the body and head are simple and cheap of manufacture and assemble in a manner that enables the piston to be closely fitted in the cylinder with which it is to be used without liability of setting and pulling apart; that the piston will be lighter in weight, better balanced and will run cooler than those in common use; that lubricant in the combustion chamber will not burn on the end of the piston; that surplus lubricant on the cylinder wall will be collected and returned; that the wrist pin will be thoroughly lubricated; and that lubricant in the crank case can not be thrown against the hot end of the piston and its viscosity and effectiveness destroyed.

This end is preferably attained by making the body of the piston of cast iron which has slight expansion and great wear and thus may be closely fitted to the cylinder, and providing the body with a head of aluminum that is much lighter and has greater heat radiating capacity than the iron body. The head has a recess around its exterior that provides a chamber for lubricant and permits the head to yield when it expands, and has a central air chamber which is closed by a lock plate in such a way that the greater the expansion of the head the more tightly will it be held to the body, the aluminum head with its lubricant recess and air chamber heat insulating the iron body and also preventing contact of crank case lubricant with the hot end of the piston.

Figure 1:
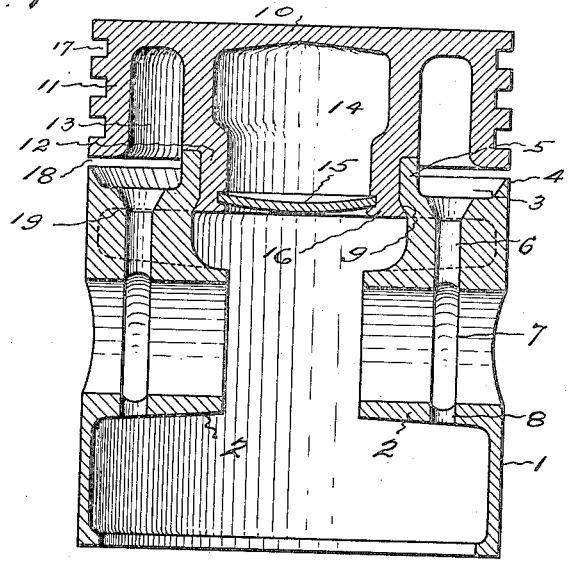
Figure 2:
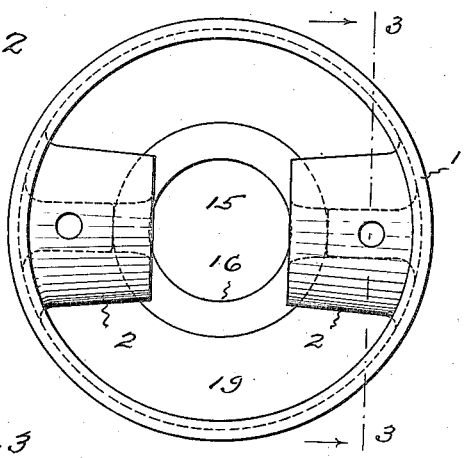
Figure 3:
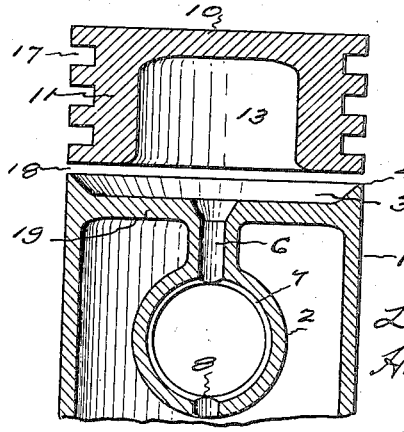

In the accompanying drawings Figure 1 shows a central longitudinal section of a piston which embodies the invention. Fig. 2 is a view looking into the piston from the open end. Fig. 3 is a section on the plane of the dotted line 3—3 on Fig. 2 looking in the direction indicated by the arrows.

The body 1 of the piston is desirably made of cast iron but it may be of other hard metal which has suitable wear-resisting qualities and little expansion when heated, so that it can be fitted closely in the cylinder with which it is to be used without danger of setting. This body is a hollow cylinder with an opening from end to end. Extending into the opening from diametrically opposite sides of the body are hubs 2 that provide approved wrist-pin bearings. Around the head end of the body is a channel 3. The outer wall of the channel is formed by the external flange 4 and the inner wall of the channel is formed by the internal flange 5, the latter flange extending beyond the end somewhat more than the former. In the body illustrated passages 6 are made from the channel to grooves 7 in the bearing walls of the hubs, and holes 8 are made from the grooves through the walls of the hubs, to permit a flow of lubricant from the channel around the wrist pins. At the bottom of the internal flange on the inside, as at 9, the wall of the opening is undercut.

The head 10 is preferably made of aluminum or some similar metal which is light in weight and which radiates heat rapidly. This head protects the body from the intense heat developed by the explosions of the fuel so that the temperature of the body keeps relatively low; it makes the structure as a whole lighter and thus reduces the momentum of reciprocation; and it moves the center of gravity nearer to the wrist-pin than if the entire piston were made of iron. The head has an external flange 11 and an internal flange 12, with an annular recess 13 between the flanges and a central chamber 14 in the inner flange. The end of the inner flange of the head is shaped to fit tightly within the inner flange of the body. A locking plug or plate 15 preferably of steel is placed in the opening at the bottom of the chamber and the edge 16 of the head flange is swaged or otherwise expanded into the undercut section of the wall of the body flange and over the edge of the locking plate.

As the aluminum has a greater co-efficient of expansion than the iron the hotter the parts become the more tightly they are held together. The locking plate prevents the head flange from collapsing or crushing and so loosening itself that the body and head can be pulled apart. The locking plate also closes the central chamber 14 which provides a dead air space that with the recess 13 heat insulates the hot end of the head from the body, and prevents lubricant from being splashed from the crank case up against the hot end of the piston and becoming burned so as to lose its life and cake on the end of the piston and add to the weight.

The external flange of the head which is slightly less in diameter than the diameter of the body has grooves 17 in its outer face for receiving piston rings and this flange does not extend quite to the external flange on the body so that an opening 18 is provided entirely around the piston into the recess 13 over the channel 3. The flange 11 is capable of yielding when it tends to expand so that it will not set in the cylinder, and the surplus lubricant on the cylinder wall is scraped off by the flange 4 and returned to the interior of the piston completely around it through the opening 18 and collects in the channel from which it flows through the passages down to the wrist-pin that thereby becomes thoroughly lubricated. The inner flange of the aluminum head is of relatively small diameter where it is connected with the body so that the expansive force which it exerts on the body is not great and the body is very strong being rigidly supported by the web 19 opposite the locality of the junction between the body and the head. This eliminates all danger of expanding the iron body under the greater expansion of the aluminum head. The light heat radiating head protects the heavier and harder wearing body in such manner as to insure a relatively low temperature for the body and also a uniform expansion throughout its entire length and this allows a closer fitting of the body in the cylinder than would be possible if the entire piston were formed of iron.

The invention claimed is:

1. An engine piston comprising a cylindrical body of hard metal having a relatively low co-efficient of expansion and a head of light metal having a relatively high co-efficient of radiation, said head having a central chamber and an annular recess surrounding the chamber, and means separating said chamber and recess from the opening in the body.

2. An engine piston comprising a body of hard metal having a relatively low co-efficient of expansion and a head of light metal having a relatively high co-efficient of radiation, said head having a central chamber and an annular recess surrounding the chamber, and means closing said chamber and locking the head to the body.

3. An engine piston comprising a body of hard metal having a relatively low co-efficient of expansion and a head of light metal having a relatively high co-efficient of radiation, said head having a central chamber and means closing said chamber and locking the head to the body.

4. An engine piston comprising a body and head fastened thereto, said head having a central air chamber and an annular recess surrounding the chamber, and means closing said chamber and locking the head to the body.

5. An engine piston comprising a body and head fastened thereto, said head having a central air chamber and means closing said chamber and locking the head to the body.

6. An engine piston comprising a body open from end to end and having an internal flange, a head having an internal flange fitted to said body flange, and means closing the opening through the body and securing the flanges together.

7. An engine piston comprising a body open from end to end and having an internal flange, a hollow head having an internal flange fitted to the body flange, and a locking plate preventing the head flange from collapsing and preventing communication between the interior of the body and the interior of the head.

LOUIS R. SPENCER.